July 30, 1957         J. T. PURVIS ET AL         2,801,070
                MOUNTING MEANS FOR TURBINE ROTORS
Filed Jan. 28, 1952                              2 Sheets-Sheet 1
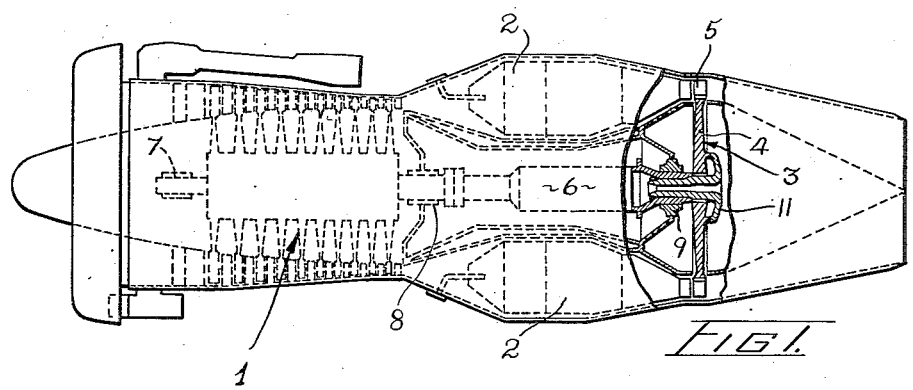
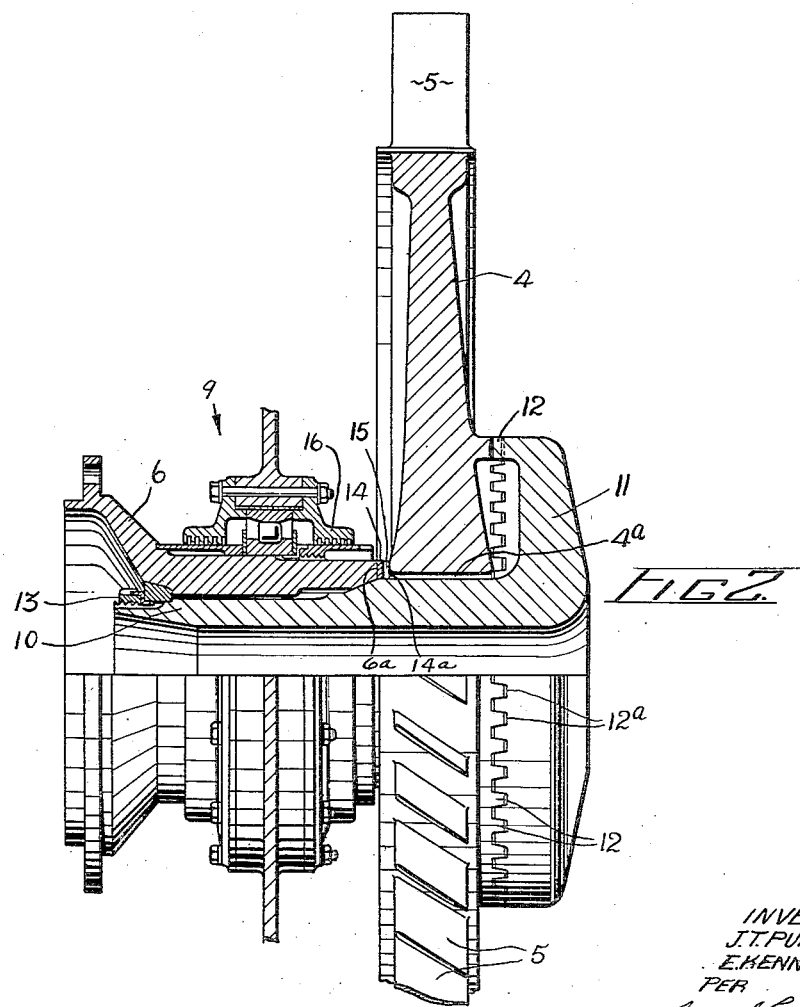
INVENTOR
J.T. PURVIS
E. KENNARD
PER
Gareth E. Waybee
ATTORNEY

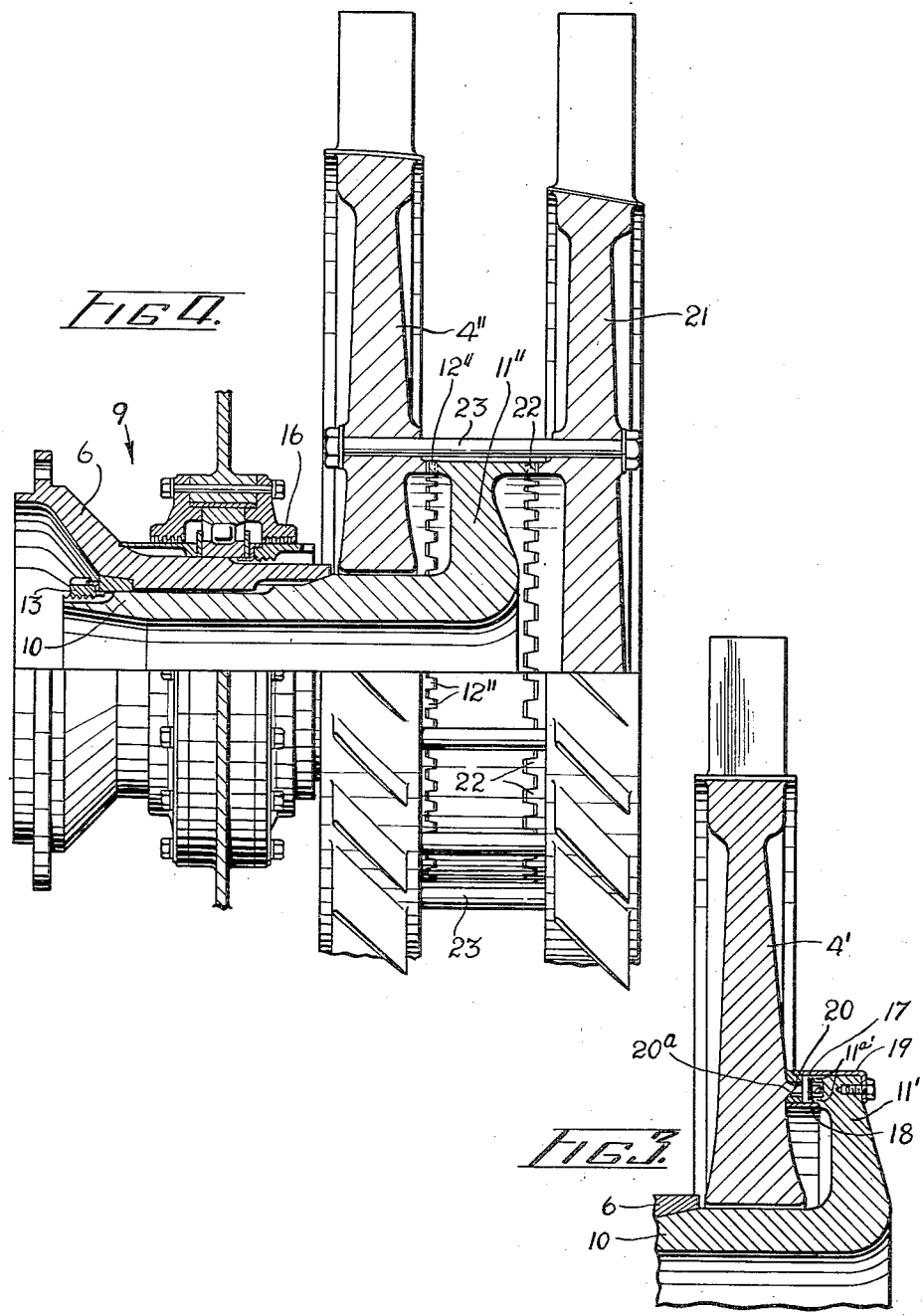

United States Patent Office 2,801,070
Patented July 30, 1957

2,801,070
MOUNTING MEANS FOR TURBINE ROTORS

Joseph Thompson Purvis, Toronto, Ontario, and Edward Kennard, Port Credit, Ontario, Canada, assignors to A. V. Roe Canada Limited, Malton, Ontario, Canada, a corporation Application January 28, 1952, Serial No. 268,656

4 Claims. (Cl. 253—39)

This invention relates to the mounting of rotor discs and in particular to the mounting of turbine rotors in gas turbine engines.

In a gas turbine engine of the usual type, having a compressor, a bank of combustion chambers and a turbine which drives the compressor through a shaft, the shaft is normally supported by two or more bearings. For structural convenience the rear bearing is usually placed in front of the turbine rotor with the rotor overhanging the bearing, thus producing a "cantilever" construction which may cause strain in the main shaft such as to produce vibration at high speed and which may have an additional disadvantage when installed in aircraft because the gyroscopic effects on the rotating turbine disc arising from manoeuvres of the aircraft may cause flexing of the shaft, resulting in a variation in the radial distance between the tip of the rotor blades and the turbine shroud. To reduce this variation to a minimum it is necessary to mount the rear bearing as close to the turbine disc as possible. Heretofore, this requirement has dictated the use of rotors which have integral discs and stub shafts, and are difficult and costly to manufacture, since turbine discs with separate stub shafts normally are difficult to mount close to the bearing because of the space required by the necessary flange on the stub shaft or other disc mounting means.

It is the principal object of this invention to provide a turbine disc mounting arrangement in which no integral stub shaft is incorporated with the disc but which nevertheless permits the mounting of the rear shaft supporting bearing in close proximity to the turbine disc.

Other objects and advantages will be apparent during the course of the following description.

In the accompanying drawings forming a part of this specification and in which like reference characters are used to designate like parts throughout the same;

Figure 1 is a side elevation of a gas turbine engine showing, partly in section, the location of the turbine disc and bearing therein;

Figure 2 is a side elevation, partly in axial section, on an enlarged scale, of the turbine disc and bearing of the engine shown in Figure 1;

Figure 3 is a similar view showing a modified construction according to the invention for mounting a turbine disc; and Figure 4 is a fragmentary axial section showing the invention applied to a two stage turbine rotor having two discs.

A conventional gas turbine engine of the type shown in Fig. 1 and adapted for use in aircraft has a compressor 1 in which a stream of air is compressed and from which the compressed air flows at high velocity into a bank of combustion chambers 2 where a suitable fuel is burned in the air stream. The products of the combustion are discharged through suitable guide means onto a turbine rotor 3 comprising a disc 4 fitted with blades 5, and the turbine in turn drives the compressor by means of a main shaft 6 journalled in bearings 7, 8 and 9.

As shown in Figure 2, the turbine disc 4 has a central hole defined by the inner periphery $4^a$ of the disc and through which a stub shaft 10 extends in annularly spaced relationship to the inner periphery of the disc. At the front of the disc the stub shaft engages the main shaft 6 adjacent the bearing 9, and on the side of the turbine disc 4 remote from the turbine bearing 9, the stub shaft 10 has a large annular connecting flange 11 engaging the disc through face splines 12 on the disc and flange, which serve as torque transmitting driving and centering means between the disc and the stub shaft 10 to transmit to the main shaft 6 the gyroscopic forces and accelerations imposed upon the turbine disc 4.

Forward of the turbine disc 4 the stub shaft 10 extends into the rear end portion of the main shaft 6, which terminates adjacent the disc with the rearward end $6^a$ of the main shaft engaging a generally annular member or shim 14 with an annular end surface $14^a$ disposed against the front face of the disc at its inner periphery $4^a$. The thickness of the shim 14 is chosen to provide the proper loading at the face splines 12 between the disc and the flange 11. A nut 13 threaded on the forward end of the stub shaft 10, secures the stub shaft to the main shaft 6 to provide a main shaft assembly including the stub shaft and the shim.

A coating of a lubricating film such as graphite or silver plating on the annular end surface $14^a$ of the shim 14 where the main shaft assembly is in contact with the turbine disc 4 is desirable in order to avoid fretting of the surfaces which might occur as a result of radial expansion of the turbine disc in operation. The shim 14 may also be provided with a number of radial channels 15 in the annular end surface $14^a$; air cooling of the inner portion of the turbine disc then may be accomplished by causing cooling air to pass through the slots and through the annular space provided between the inner periphery $4^a$ of the disc and the stub shaft, the flow of air being induced according to conventional methods by providing a differential in the pressure of the air behind and in front of the disc 4. The air may be discharged over the rear face of the disc 4 through clearances $12^a$ provided by truncation of the face splines 12.

The construction which has been described in the preceding paragraphs will permit the turbine bearing to be mounted as close to the forward face of the turbine disc as if a stub shaft integral with the disc, which as has been stated is costly and difficult to manufacture, were used. The bearing 9 is conventionally enclosed within an oil seal 16 and it is evident from Figure 2 that the minimum distance of the bearing 9 from the disc 4 is determined only by the space requirements of the oil seal and any provisions which must be made for the passage of cooling air as described in the preceding paragraph.

An alternative form of construction is illustrated in Figure 3 wherein the driving and centering between the rotor disc 4' and the connecting flange 11' is accomplished by means of radial pins 17 extending through an annular fin 20 on the rear face of the rotor disc and through annular jaws $11^{a'}$ on the flange 11', the jaws $11^{a'}$ providing a groove in the front face of the flange 11' to receive loosely the annular fin 20. Stop rings 18 and 19 are provided on the radially inner and outer cylindrical surfaces, respectively, of the jaws $11^{a'}$ to prevent the radial pins 17 from sliding out of place. An annular shoulder $20^a$ on the disc 4' at the radially inner cylindrical face of the fin 20 is arranged to engage the radially inner wall of the groove between the jaws $11^{a'}$ to ensure concentricity between the disc and flange while the pins 17 are being fitted and inserted. The radial growth of the disc 4' produced by thermal and centrifugal effects loosens the engagement of the shoulder 20ª on the flange 11' during operation so that centering of the rotor disc 4' with respect to the flange 11' is accomplished by the radial pins 17 alone.

Figure 4 shows the invention applied to a turbine rotor consisting of two discs 4" and 21. In this arrangement the flange 11" is coupled to each of the two discs by means of the face splines 12" and 22. The face splines are held in engagement by the clamping action of annularly grouped bolts 23 passing through both discs; to reduce as far as possible local stresses in the discs caused by the presence of the bolt holes, the discs are thickened in the region of the bolt holes.

It is to be understood that the form of the invention herewith shown and described is to be taken as a preferred example of the same and that various changes in the shape, size and arrangement of the parts may be resorted to without departing from the spirit of the invention or the scope of the subjoined claims.

What we claim as our invention is:

1. In a machine, a rotor disc having a central aperture, a bearing adjacent and co-axial with the rotor disc, a main shaft assembly including a main shaft rotatably mounted in the bearing and providing an annular end surface bearing against the rotor disc on the side thereof facing the bearing, the rotor disc presenting a rearward face on the side thereof remote from the bearing, and means connecting the rotor disc to the main shaft assembly in torque transmitting relationship and comprising a stub shaft extending co-axially from the end of the main shaft and operatively connected to the main shaft assembly, the stub shaft being encircled by the said annular end surface and extending axially through the aperture in the rotor disc in annularly spaced relationship thereto, means on the stub shaft for locating the stub shaft axially with respect to the main shaft assembly, a connecting flange extending generally radially from the stub shaft at the side of the rotor disc remote from the bearing, the said connecting flange presenting a forward face opposed to the rearward face of the rotor disc, and a plurality of radially arranged surface discontinuities on the forward face of the connecting flange and the rearward face of the rotor disc and arranged in torque transmitting interengagement.

2. The combination as claimed in claim 1 in which the said annular end surface has a channel for the passage of air from the front of the rotor disc through the said channel and into the space between the stub shaft and the rotor disc, and in which there are air flow clearances between the said surfaces discontinuities to permit air to flow from the said space past the connecting flange.

3. The combination as claimed in claim 1 in which the main shaft assembly includes a generally annular member disposed around the stub shaft and providing the said annular end surface.

4. The combination as claimed in claim 3 in which the said generally annular member has channels for the passage of air from the front of the rotor disc through the said channel and into the space between the stub shaft and the rotor disc, and in which there are air flow clearances between the said surface discontinuities to permit air to flow from the said space past the connecting flange.

References Cited in the file of this patent

UNITED STATES PATENTS

| | | |
|---|---|---|
| 785,071 | Pugh | Mar. 14, 1905 |
| 2,492,833 | Baumann | Dec. 27, 1949 |
| 2,557,747 | Judson et al. | June 19, 1951 |
| 2,575,237 | Sollinger et al. | Nov. 13, 1951 |
| 2,577,134 | Land | Dec. 4, 1951 |
| 2,639,579 | Willgoos | May 26, 1953 |
| 2,680,001 | Batt | June 1, 1954 |

FOREIGN PATENTS

| | | |
|---|---|---|
| 90,860 | Sweden | Nov. 23, 1937 |
| 232,208 | Switzerland | Aug. 1, 1944 |